Jan. 26, 1965 C. J. CRETORS 3,167,453
APPARATUS FOR PRODUCING CANDY COATED POPPED CORN AND THE LIKE
Filed Nov. 21, 1960 3 Sheets-Sheet 1

Inventor
Charles J. Cretors
by Olson, Mecklenburger, von Holst
Pendleton & Neuman Attys

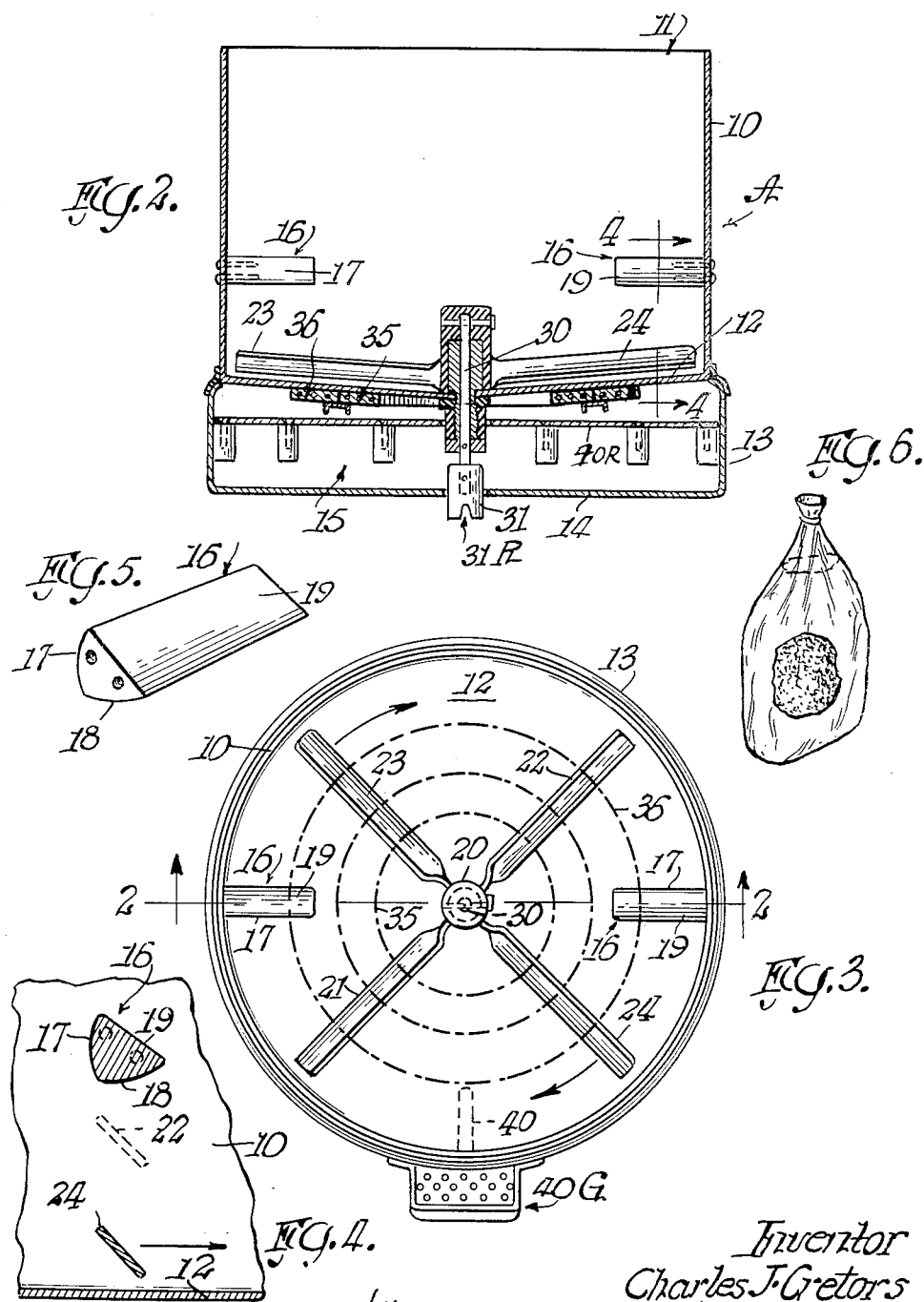

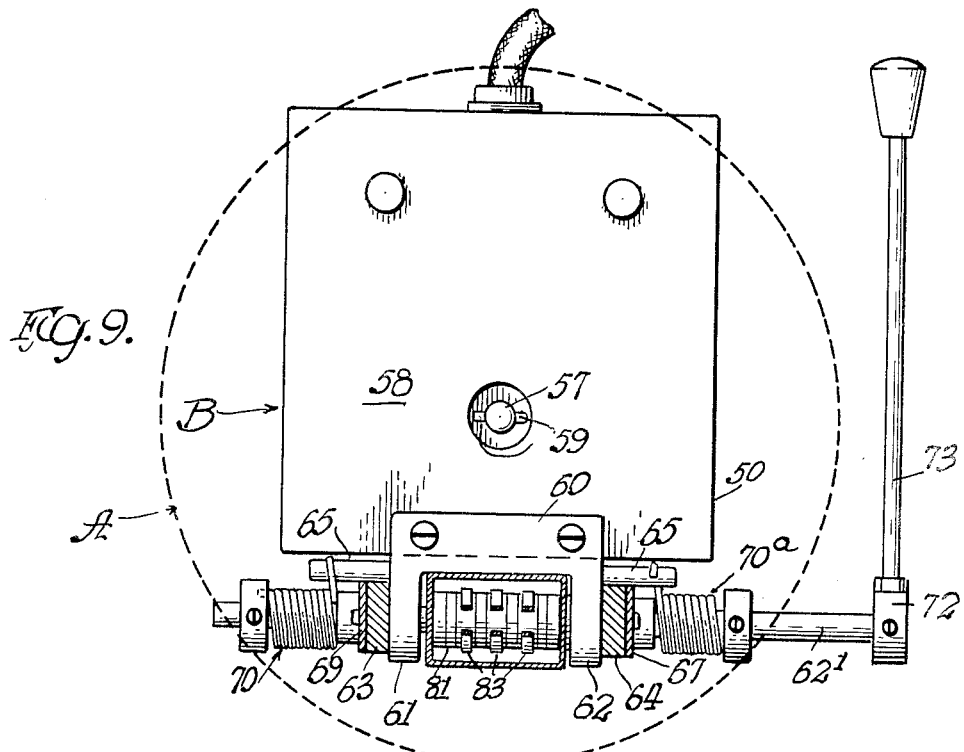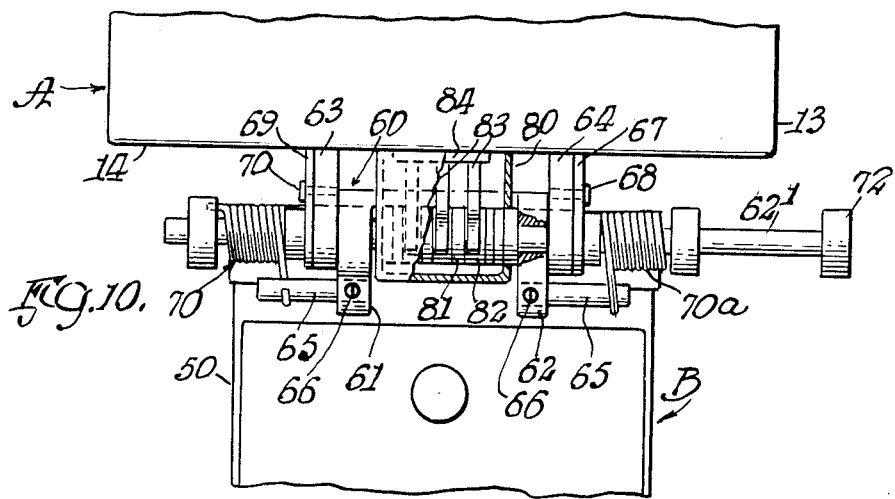

United States Patent Office 3,167,453
Patented Jan. 26, 1965

3,167,453
APPARATUS FOR PRODUCING CANDY COATED POPPED CORN AND THE LIKE
Charles J. Cretors, Highland Park, Ill., assignor to C. Cretors & Co., Chicago, Ill., a corporation of Illinois
Filed Nov. 21, 1960, Ser. No. 70,547
6 Claims. (Cl. 118—19)

The invention relates to the production of popped corn and the like having a candy-like coated surface. One illustration of this type of candy coated popped corn is the so-called caramel coated popped corn, which is quite extensively sold. As by way of illustration and not by way of limitation, reference will be made particularly to the production of caramel coated popped corn. Notwithstanding the fact that caramel coated popped corn is sold in large quantities, as a rule, coating the popped corn with the caramelized materials is generally a hand operation. Therefore, the operation is a rather slow and laborious one, increases the cost of production, and, because of the fact that the popped corn is hand-manipulated, is likely to result in batches which are not uniform in character.

One of the objects of the invention is to provide a process wherewith it shall be possible to produce the candy coated popped corn and the like of a more uniform character.

Another object of the invention is to provide a process wherewith the cost of production will be reduced.

Another object of the invention is to provide a process for the production of candy coated popped corn and the like which shall comprise simple steps which can readily be accomplished by persons without any special skill.

Still another object of the invention is to provide apparatus for use in facilitating the practice of the process.

It is also an object of the invention to provide apparatus for use in producing candy coated popped corn and the like, which apparatus shall be of simple construction and wherewith it shall be possible rapidly to produce batches of candy coated popped corn and the like of uniform character.

Other objects of the invention will appear in the course of the description of a preferred embodiment of a machine adapted to practice the process. The preferred form of the machine is illustrated in the accompanying drawings, wherein:

FIG. 2 is a transverse vertical sectional view of the upper part of the machine taken on the line 2—2 of FIG. 3, certain of the parts being shown in elevation;

FIG. 3 is a top plan view of the upper part of the machine;

FIG. 4 is a detailed vertical fragmentary view on the line 4—4 of FIG. 2;

FIG. 5 is a perspective view of one of the members against which the product being coated is forced during the process of coating the same;

FIG. 6 is a perspective view of a package of the coating material suitable for coating a batch of popped corn;

FIG. 9 is a view on the line 9—9 of FIG. 1; and

FIG. 10 is a fragmentary elevational view on the line 10—10 of FIG. 1.

Figure 1:
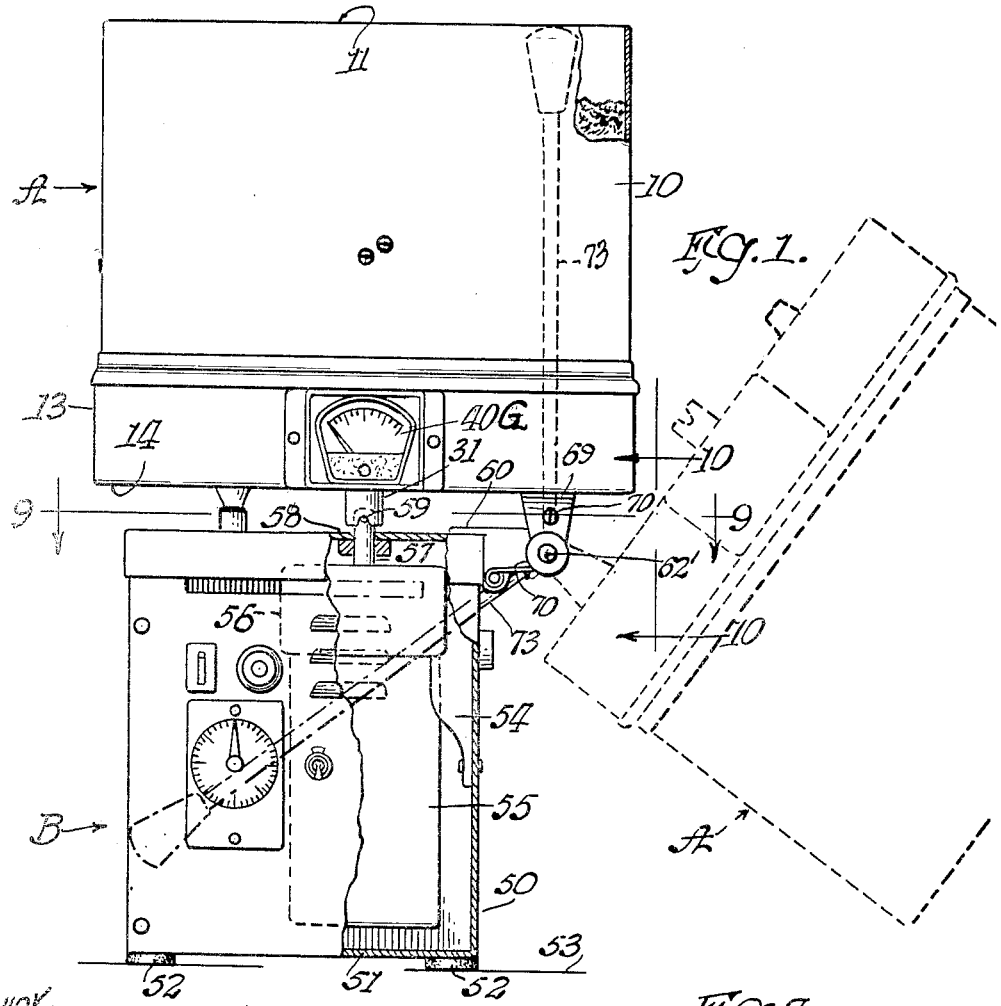
FIGURE 1 is an elevational view of the machine, certain of the parts being broken away for illustrative purposes and certain of the parts being shown in two positions, one by means of full lines, and the other by means of dotted lines.

The machine illustrated for use in the practice of the process comprises an upper section A, sometimes termed "kettle," and a lower section B, sometimes termed "power section." The kettle A is in the form of a cylindrical receptacle 10 having an open top 11 and a closed bottom 12. The bottom 12 preferably slopes downwardly and inwardly from the outer vertical wall portion, the purpose of which will be later described.

The upper part 10 of the kettle rests upon an annular support portion 13, the latter being closed by a horizontal bottom sheet 14, thus forming a chamber 15 in conjunction with the bottom 12 of the receptacle portion 10.

Secured to the vertical wall of the receptacle portion 10, at diametrically opposite points are two stator members 16, the details of which are best shown in FIGS. 4 and 5. Since the two members 16 are alike, a description of one will suffice for both. The member 16, sometimes termed "stator" or "baffle," is of elongated form and, in cross section, has a curved wall or surface 17 which, when in position, is generally disposed in an upright position; and a lower curved face or surface 18 which starts at the lower edge of the surface 17 and swings in a gentle upward curve to a point of junction with an inclined surface 19 extending between the upper edge of the surface 17 and the upper edge of the surface 18. The function of member 16 will be discussed later.

*The agitator*

Figure 7:
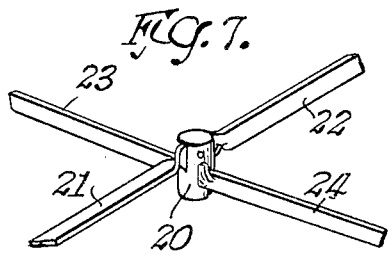
FIG. 7 is a perspective view of an agitator which is disposed in the machine for rotary motion on a vertical axis.

The agitator, shown in perspective in FIG. 7, comprises a central hub portion 20 from which radiate four elongated blades 21, 22, 23, and 24. Two of the blades, 21 and 22, are diametrically opposite being at a higher elevation than the other two blades, 23 and 24, which are likewise diametrically disposed. As is best shown in FIG. 4, the main body portion of each blade is disposed on an angle relative to the vertical plane, so that, when the blades approach a position ready to pass under the baffle 16, they occupy the angular positions shown in full lines for the lower blades and in dotted lines for the upper blades, the function of which will be explained when describing the mode of operation.

The hub 20 of the agitator is affixed to a vertical drive shaft 30, the lower end of which is secured to the upper part of a clutch member 31, the lower part of which projects downwardly from the bottom wall 14 of the kettle A having a recess 31R therein for interfitting reception of a clutch part driven by motor and gearing positioned in power section B, as will be shortly described.

Inasmuch as heat is required during the coating operation, there is provided heating elements 35 and 36, the details of which will be explained later.

In the chamber 15 of the kettle A, there is provided a pyrometer 40, the gauge portion 40G of which is positioned externally on the lower part 13 of the kettle as is best illustrated in FIG. 1. 40R is a bright metal disc which acts to reflect heat.

*The power section B*

The power section B comprises a casing 50 having a bottom 51 with depending legs 52 adapted to rest upon any suitable supporting surface 53.

Supported within the casing 50, by means of brackets 54, is a motor-gearing unit in which the lower portion 55 comprises an electric motor and the upper portion 56, a reduction gear operatively connected to the armature shaft of the motor. The reduction gear is connected to drive the upstanding shaft 57 which extends upwardly beyond the top plate 58 of the casing. The shaft 57, adjacent its upper end, is provided with outstanding projections 59 adapted to fit operatively into the recess 31R of the depending member 31 of the kettle section A.

Mounting of kettle on power section

The kettle A is mounted on the power section B so that it can be swung from the full line position (FIG. 1) in which the coating process takes place to the dotted line position for discharging the coated product. The means for so mounting the kettle and the associated parts are best illustarted in FIGS. 1, 9 and 10.

Mounted on the top of the power section at one side thereof is a bracket 60 having a pair of arms 61 and 62 which project outwardly therefrom and which have openings therein to provide bearings for the reception of a horizontally disposed shaft 62' positioned therein for partial rotation. Secured to the bottom of the kettle are two depending lugs 63 and 64, each of which has a downwardly opening recess in the bottom adapted to receive the upper portion of the shaft 62' and aid in supporting the kettle for rocking or swinging movement about the axis of shaft 62', as indicated by the full and dotted lines in FIG. 1.

Supported in the lower portions of the arms 61 and 62 are rods 65 fixed against rotation by set screws 66.

Secured to the shaft 62' and upstanding therefrom is a plate 67 which is fastened to the depending lug 64 by set screw 68. A similar plate 69 is positioned on the outer side of lug 63 and is fastened thereto by set screw 70 but is not fixed to rotate with shaft 62'.

To make the work of tipping the kettle between the full and dotted line positions easier, there is provided means for counterbalancing the weight of the kettle. The form shown comprises a pair of opposing torsion springs 70 and 70a which are operatively connected at one end to the shaft 62', and at the other end to the rods 65. They function in the same general way as do the springs 47 and 47a and associated parts in connection with the corn popping kettle 35 disclosed in my Patent 2,537,744 of January 9, 1951. Reference to that patent may be made if further information concerning the counterbalance feature is desired.

Fixed to one end of the shaft 62' is a collar 72 to which is attached one end of a lever 73 by means of which the kettle can be swung between the full and dotted line positions, the latter being the dumping position.

The kettle heating means

Supported in contacting relation with the lower face of bottom 12 of the receptacle portion 10 of the kettle A are two concentrically arranged electric heating elements 35 and 36 in order to apply heat well-distributed to the bottom of bottom 12 of the container portion 10. The heating elements are such as will be able, in a few minutes, to raise the temperature of the container bottom 10 to desired magnitude, as will be more specifically described when explaining the mode of operation in connection with one practical embodiment of the invention.

Figure 8:
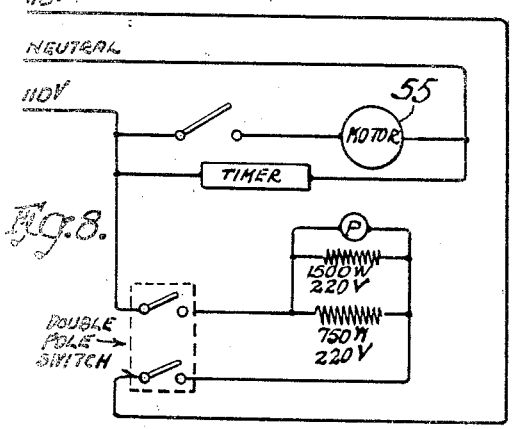
FIG. 8 is a schematic view illustrating the wiring diagram of the machine.

In order to supply current to the heating elements 35 and 36, there is operatively secured to the shaft 62' within the housing member 80 a sleeve of insulation 81 on which there is mounted a plurality of longitudinally spaced current distributor rings 82, engaged by brushes 83, carried by an insulating block 84, the brushes 83 being electrically connected to the heating elements 35 and 36. The distributor rings are energized by a current supply cable leading from the power section B when a double pole switch is closed, as will be clear in connection with the statement of operation having particular reference to the electrical diagram FIG. 8.

Mounted on the power section B is a conventional timer having a lever which can be set to buzz after the passage of a predetermined time calibrated in minutes.

Mode of operation

It is believed that sufficient structure has now been described so that a description of the mode of operation will enable one to understand the steps of the process involved and mechanism adapted to practice the invention.

As by way of illustration and not by way of limitation, except as to limitations which may be embodied in the claims, the mechanism and process will be described in connection with a practicale embodiment of the invention for producing the so-called caramel coated popped corn.

In one such embodiment, the kettle A is approximately 16 inches in diameter having an overall height of about 12 inches, the container portion having a depth on the order of 8 inches.

The caramel candy coating material conveniently is supplied in a flexible container (see FIG. 6) of a size to hold about two pounds fourteen ounces of the coating candy which, at ordinary room temperature, forms a somewhat plastic mass such that, when opening the flexible container, the whole can be discharged into the container 10 of the kettle substantially as a unit.

Assume that the first batch of popped corn is to be coated and that the kettle is in a cool state. Before placing the caramel corn candy coating material into the receptacle 10 of the kettle, first close the double pole switch (see FIG. 8), thereby energizing the two heating elements 35 and 36 in the kettle. Set the timer at three minutes. Then, when the timer buzzes, discharge a batch of candy caramel coating material into the receptacle 10 and reset the timer to six minutes. As the batch melts, turn on the switch to energize the motor which will rotate the agitator and, after a brief interval sufficient to distribute the coating material uniformly over the bottom of the receptacle, turn the switch to off position. When the timer buzzes again, check the pyrometer and, if it indicates 300° and/or the coating material begins to smoke, turn off the heat switch and discharge into the receptacle approximately one and one half pounds of popped corn. Turn on the motor switch again and set the timer to three minutes. After two minutes, the timer will buzz, the timer being one which buzzes for one minute prior to expiration of a set period. When the timer buzzes, turn off the motor switch, at which time the popped corn should be fully coated. At that time, the kettle A can be swung by means of the lever 73 to the dotted line position (FIG. 1), thereby discharging the fully coated popped corn therefrom.

If one desires to repeat the coating of another batch of popped corn, the above steps will be followed except that it will not be necessary to repeat the first step mentioned above, i.e. heating the cool kettle, which is only necessary when the receptacle is cold, in order to bring the same up to the desired temperature.

After the last batch has been made, it is advisable to pour one cup of water into the kettle and leave it there until the next use. This will prevent the coating material from hardening under the blades of the agitator and avoid causing it to stick and cause possible damage to the motor drive.

It will, of course, be understood that when the motor 55 is energized, the gearing 56 becomes operative to rotate the shaft 57 at reduced speed of the order of 60 r.p.m. which, as before explained, is operatively connected to drive the agitator.

The above describes the steps which are to be taken in coating a batch of popped corn, but does not fully explain the manner in which the popped corn is manipulated in the receptacle 10 when the agitator is being rotated and the popped corn and coating mix have been placed in the receptacle as before explained.

The rotation of the agitator causes the popped corn at the bottom of the receptacle 10 to move in a circular direction. However, as the popped corn approaches the stators 16 further movement of the popped corn in the lower strata is obstructed, the popped corn being thrust upwardly and in a sort of rolling or tumbling action. It is thought this action results from the fact that the popped corn at the bottom of the kettle, when engaging the warm, sticky coating material at the bottom of the kettle, converts a number of the kernels of popped corn into an adherent conglomerate portion which, meeting the stator obstruction, is thrust upwardly being unable to continue to move around the bottom in the same plane, because there is insufficient space below the stator to permit such an adherent mass to pass freely thereunder. There is thus produced an unexpected rolling or wave-like motion of the popped corn, the light corn in the upper strata of the kettle being positively and quickly tumbled or moved downwardly toward the bottom of the receptacle 10. By continuing this somewhat wave-like rolling or tumbling action for a time, the entire superficial area of each kernel of popped corn is coated substantially throughout.

Since hand manipulation of the popped corn is not required in the kettle, it is possible to coat batch after batch with uniformity and dispatch.

I claim:

1. In a machine for producing candy coated popped corn and the like, the combination of a receptacle for holding a quantity of popped corn and having a bottom portion for sustaining a quantity of coating material, baffle means secured to and extending inwardly of the receptacle, means for moving a lower strata of popped corn toward said baffle means whereby portions of the product to be coated are converted into an adherent conglomerate said baffle means being shaped to separate said adherent conglomerate from said lower strata whereby said conglomerate is forced upwardly to cause popped corn at a higher elevation to move downwardly and produce a rolling movement.

2. In a machine for producing candy coated popped corn and the like, the combination of a circular receptacle for holding a quantity of popped corn or the like and having a bottom portion for sustaining a quantity of coating material, rotatable means including a plurality of blades radiating from a central driven member, portions of which are disposed at an inclination intermediate the horizontal and the vertical for moving a lower strata of the product to be coated in a generally circular direction, means spaced above said rotatable means for obstructing the movement of said product in a lower strata, whereby portions of the product to be coated are forced upwardly to produce an undulatory movement.

3. The combination set forth in claim 2 in which some of said blades are positioned to rotate in a plane above the plane of rotation of other of said blades.

4. In a machine for producing candy coated popped corn and the like, the combination of a circular receptacle for holding a quantity of popped corn and having a bottom portion for sustaining a quantity of coating material, rotatable means for moving a lower strata of the product to be coated in a generally circular direction, means spaced above said rotatable means for obstructing the movement of said product in a lower strata, whereby portions of the product to be coated are converted into an adherent conglomerate and forced upwardly, and means forming a chamber below the bottom of the receptacle, said means including a bottom wall, means in said chamber for heating the bottom of the receptacle, and means interposed between said heating means and said chamber bottom wall for reflecting heat toward the receptacle bottom.

5. In a machine for producing candy coated popped corn and the like, the combination of a circular receptacle for holding a quantity of popped corn or the like and having a bottom portion for sustaining a quantity of coating material, rotatable means including a plurality of blades radiating from a central driven member for moving a lower strata of the product to be coated in a generally circular direction, means spaced above said rotatable means for obstructing the movement of said product in a lower strata, whereby portions of the product to be coated are forced upwardly, and a power unit underlying and supporting the said circular receptacle, said power unit comprising an electric motor having a vertically disposed armature shaft operatively connected to drive a reduction gearing, said reduction gearing being operatively connected to drive said rotatable means.

6. The machine of claim 1 wherein each of the baffle means has a generally upright wall portion and a lower face which meet along an elongate edge toward which said means for moving moves said adherent conglomerate to separate said lower strata.

References Cited in the file of this patent
UNITED STATES PATENTS

| | | |
|---|---|---|
| 452,147 | Neubling | May 12, 1891 |
| 1,320,766 | Knott | Nov. 4, 1919 |
| 1,642,531 | Barnard | Sept. 13, 1927 |
| 1,879,927 | Eakins | Sept. 27, 1932 |
| 2,308,420 | Hoopes | Jan. 12, 1943 |
| 2,451,096 | Kooman | Oct. 12, 1948 |
| 2,736,288 | Clay et al. | Feb. 28, 1956 |
| 2,893,332 | Roser et al. | July 7, 1959 |
| 2,905,452 | Appleton | Sept. 22, 1959 |
| 2,958,602 | Gilmore | Nov. 1, 1960 |